(12) United States Patent
Page

(10) Patent No.: US 6,684,995 B1
(45) Date of Patent: Feb. 3, 2004

(54) AUTOMATIC TRANSMISSION ROTATING CLUTCH WITH NO RETURN SPRING

(75) Inventor: Joseph J. Page, Ann Arbor, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/228,428

(22) Filed: Aug. 27, 2002

(51) Int. Cl.$^7$ .......................................... F16D 25/0638
(52) U.S. Cl. .............................. 192/85 AA; 192/106 F
(58) Field of Search ........................ 192/85 AA, 70.2, 192/70.11, 106 F; 188/71.5, 72.3, 72.4

(56) References Cited

U.S. PATENT DOCUMENTS

| | | | | |
|---|---|---|---|---|
| 5,012,908 A | * | 5/1991 | Kobayashi et al. | ............ 192/35 |
| 5,016,742 A | * | 5/1991 | Peier | ....................... 192/58.42 |
| 5,511,644 A | * | 4/1996 | Murata | ................... 192/85 AA |
| 5,701,976 A | * | 12/1997 | Kumagai et al. | .......... 188/71.5 |
| 6,021,879 A | | 2/2000 | Pelouch | ................... 192/106 F |
| 6,415,901 B1 | * | 7/2002 | Usoro | ................... 192/85 AA |
| 6,543,597 B2 | * | 4/2003 | Tanikawa | ................ 192/87.11 |

* cited by examiner

Primary Examiner—Saul Rodriguez
(74) Attorney, Agent, or Firm—Leslie C. Hodges

(57) ABSTRACT

A clutch assembly for a transmission is configured to selectively interconnect a first rotatable member with a second rotatable member by engagement of a clutch pack. The clutch assembly includes a compensator and a piston which is axially moveable with respect to the compensator and configured to selectively abut and engage the clutch pack to interconnect the first and second rotatable members. A clutch housing encloses the piston, compensator and clutch pack. A piston cavity is formed between the housing and piston to receive fluid from a clutch apply feed orifice to actuate the piston. A compensator cavity is formed between the compensator and piston to receive fluid from a compensator feed orifice. The piston cavity and compensator cavity are configured such that fluid in the compensator cavity provides a greater centrifugal pressure force against the piston in a clutch release direction than fluid in the piston cavity provides against the piston in a clutch apply direction during rotation, thereby eliminating the need for a return spring in the compensator cavity.

13 Claims, 2 Drawing Sheets

AUTOMATIC TRANSMISSION ROTATING CLUTCH WITH NO RETURN SPRING

TECHNICAL FIELD

The present invention relates to a rotating clutch assembly for an automatic transmission in which no return spring is needed as a result of an enlarged compensator cavity.

BACKGROUND OF THE INVENTION

Clutch assemblies are used in automatic transmissions to selectively engage and disengage rotating members of different planetary gear sets. For example, a clutch may be engaged to connect the sun gear of a first planetary gear set to a ring gear of a second planetary gear set. The clutch typically includes a hydraulically-actuated piston and a series of clutch plates.

A typical prior art rotating clutch system 10 is shown in FIG. 1. As shown, the rotating clutch system 10 selectively connects a first rotatable member 12 with a second rotatable member 14 by engagement of the clutch pack 16. The various components shown in FIG. 1 are arranged concentrically about the centerline 18 of the transmission.

The rotating clutch system 10 includes a compensator 20 and a movable piston 22. A clutch housing 24 encloses the piston 22, compensator 20, and clutch pack 16.

A piston cavity 26 is formed between the housing 24 and the piston 22 to receive fluid from a clutch apply feed orifice 28. A compensator cavity 30 is formed between the compensator 20 and the piston 22 to receive fluid from a compensator feed orifice 32.

The piston 22 includes an abutment end 34 which selectively engages the clutch plate 36 when the piston 22 is applied to compress the clutch pack 16 to engage the first and second rotatable members 12, 14.

A return spring 38 is provided in the compensator cavity 30 between the compensator 20 and piston 22 to bias the piston 22 away from the clutch pack 16 to assure that the piston 22 is in a disengaged position with respect to the clutch pack 16 when the clutch housing 24 is rotating and the piston clutch is desired released, and to assist the fluid in the compensator cavity 30 in overcoming centrifugal pressure force which is applied against the piston 22 by fluid in the piston cavity 36.

It is desirable to improve upon prior art rotating clutch systems by reducing costs, improving packaging efficiency, reducing weight, easing assembly, and improving performance. Of course, the return spring 38 has a cost associated with the component, requires additional packaging space, adds mass to the assembly, and adds a step to the assembly process. A special tool is required to compress the spring to allow insertion of the compensator 20 so that the snap ring 40 may be installed.

Also, there may be a significant variation in the spring rate of the return spring as a result of manufacturing variations. The pressure required to stroke the piston against the spring may vary considerably as a result of such spring manufacturing variations, especially in light of the additional stack up tolerance of the clutch pack arrangement, which narrows the acceptable spring rate of the return spring. These matters complicate and add cost to the manufacturing and assembly processes associated with the clutch assembly. The performance of the transmission also benefits from the reduced variation in stroked return spring pressure by having more consistent shift-to-shift and transmission-to-transmission variation.

SUMMARY OF THE INVENTION

The present invention improves upon prior art rotating clutch systems by eliminating the return spring. This is achieved by enlarging the compensator cavity so that centrifugal pressure force against the piston from the compensator cavity is greater than the centrifugal pressure force against the piston from fluid in the piston cavity. In this manner, the return spring is eliminated.

More specifically, the invention provides a clutch assembly for a transmission which is configured to selectively interconnect a first rotatable member with a second rotatable member by engagement of a clutch pack. The clutch assembly includes a compensator and a piston which is axially movable with respect to the compensator and configured to selectively abut and engage the clutch pack to interconnect the first and second rotatable members. A clutch housing encloses the piston, compensator and clutch pack. The piston cavity is formed between the housing and the piston to receive fluid from a clutch apply feed orifice to actuate the piston. The piston cavity has an outer radius ($R_{op}$). A compensator cavity is formed between the compensator and piston to receive the fluid from a compensator feed orifice. The compensator cavity has an outer radius ($R_{oc}$) which is greater than the outer radius ($R_{op}$) of the piston cavity. The ensures that the fluid in the compensator cavity acting on the piston provides a greater centrifugal pressure force than fluid in the piston cavity acting on the piston, thus allowing the piston to remain in a released state when the released state is desired. This eliminates the need for a return spring in the compensator cavity.

Preferably, the housing is integral with the first rotatable member. A snap ring is positioned to prevent axial movement of the compensator.

The piston is configured to form first and second cup-shaped portions. The first and second cup-shaped portions cooperate to form first and second steps in a radially outward direction. The housing is configured to form third and fourth cup-shaped portions aligned with the first and second cup-shaped portions of the piston, such that a rim of the housing between the third and fourth cup-shaped portions extends between the first and second steps, thereby reducing size of the housing to improve packaging efficiency.

In accordance with another aspect of the invention, a clutch assembly is provided for a transmission to selectively interconnect a first rotatable member with a second rotatable member by engagement of a clutch pack. The clutch assembly includes a compensator and a piston which is axially movable with respect to the compensator and configured to selectively abut and engage the clutch pack to interconnect the first and second rotatable members. A clutch housing encloses the piston, compensator and clutch pack. A piston cavity is formed between the housing and piston to receive fluid from a clutch apply feed orifice to actuate the piston. A compensator cavity is formed between the compensator and piston to receive fluid from a compensator feed orifice. The piston cavity and compensator cavity are configured such that fluid in the compensator cavity provides a greater centrifugal pressure force against the piston in a clutch release direction than fluid in the piston cavity provides against the piston in a clutch apply direction during rotation, thereby eliminating the need for a return spring in the compensator cavity.

The above objects, aspects, features, and advantages, as well as other objects, aspects, features and advantages of the present invention are readily apparent from the following detailed description of the best mode for carrying out the invention when taken in connection with the accompanying drawings.

DESCRIPTION OF THE PREFERRED EMBODIMENT

Figure 2:
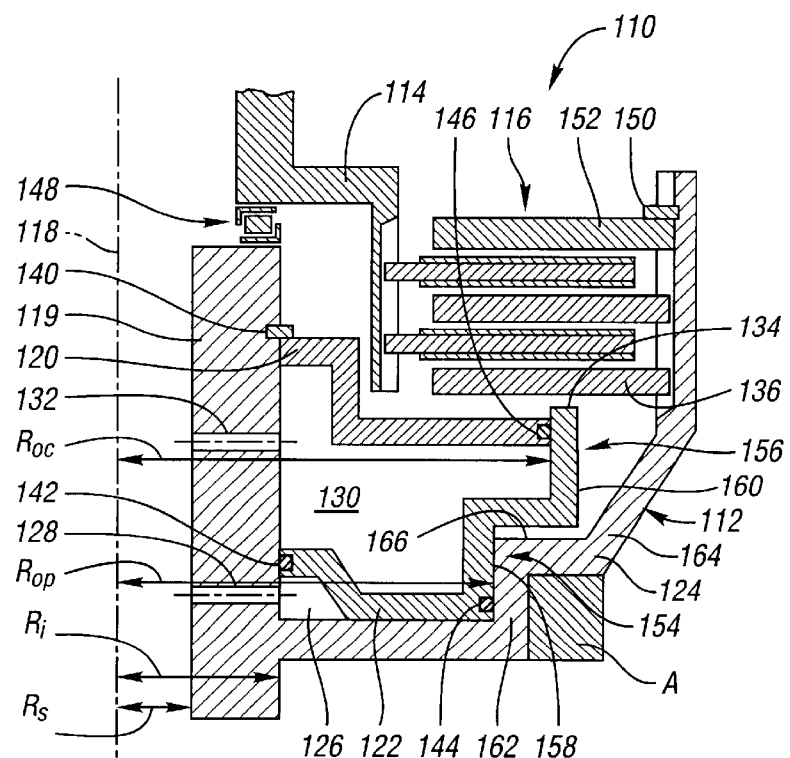
FIG. 2 shows a schematic partial longitudinal cross-sectional view of a rotating clutch system in accordance with the present invention.

FIG. 2 shows a schematic partial longitudinal cross-sectional view of a rotating clutch system 110 in accordance with the present invention. The rotating clutch system 110 selectively connects the first rotatable member 112 with the second rotatable member 114 via the clutch pack 116. The first and second rotatable members 112, 114 and the clutch pack 116 are rotatable about the centerline 118.

A compensator 120 is secured axially along the rotatable member 119 by the snap ring 140. As shown, the compensator 120 is a plate or disk-shaped member.

A piston 122 is axially moveable with respect to the compensator 120 and configured to selectively abut and engage the clutch plate 136 of the clutch pack 116 to engage the clutch pack 116 to interconnect the first and second rotatable members 112, 114. A clutch housing 124 encloses the compensator 120, piston 122 and clutch pack 116.

A piston cavity 126 is formed between the housing 124 and piston 122 to receive fluid from the clutch apply feed orifice 128. A compensator cavity 130 is formed between the compensator 120 and piston 122 to receive fluid from the compensator feed orifice 132. When pressurized, the fluid is applied to the piston cavity 126 through the clutch apply feed orifice 128 from a supply channel within the rotatable member 119, and pressure from the fluid moves the piston 122 in the clutch apply direction so that the abutment end 134 of the piston 122 engages the plate 136 of the clutch pack 116 to compress and engage the clutch pack 116. The piston cavity 126 is sealed by the seals 142, 144. The compensator cavity 130 is sealed by the seal 146.

A bearing 148 is provided between the rotatable members 114, 119. A snap ring 150 axially secures the end plate 152 of the clutch pack 116 with respect to the housing 124.

Figure 3:
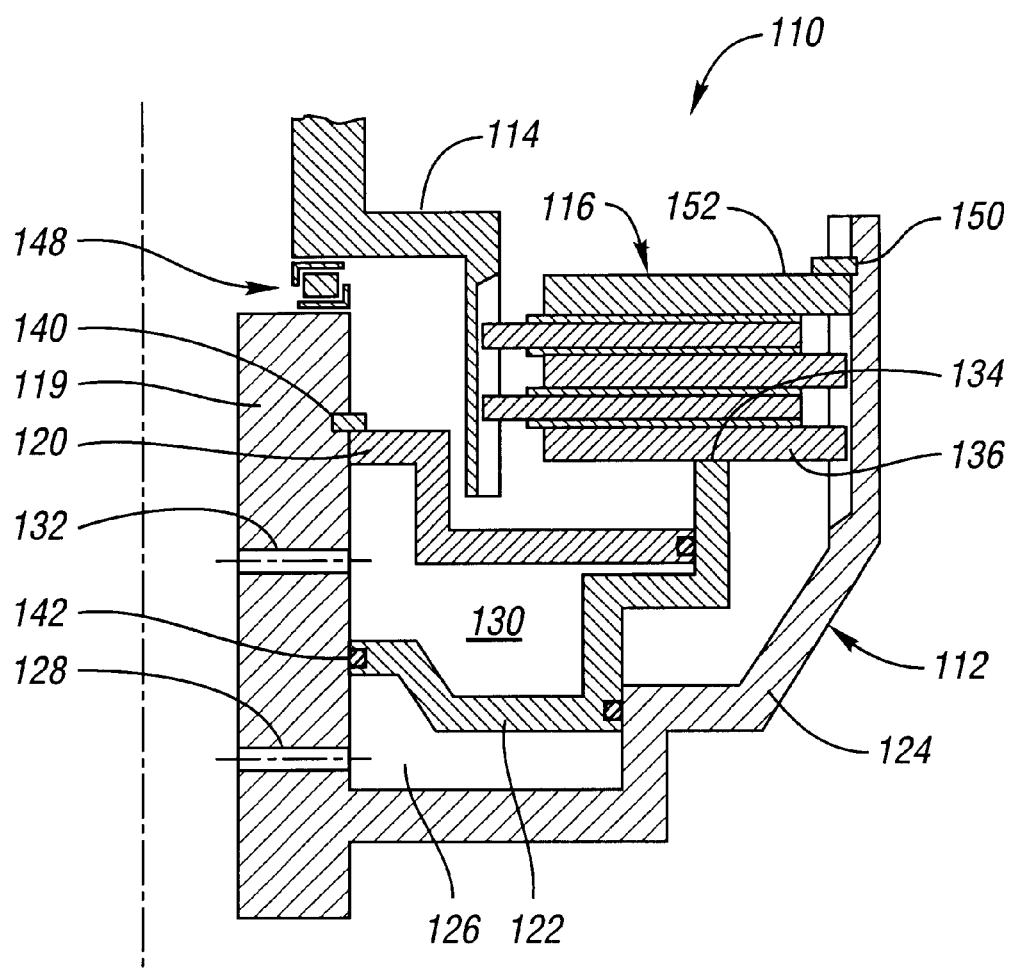
FIG. 3 shows a schematic partial longitudinal cross-sectional view of the rotating clutch system of FIG. 2 with the clutch pack engaged.

FIG. 3 shows the rotating clutch system 110 of FIG. 2 with the piston 122 in the engaged position compressing the clutch pack 116 so that the first rotatable member 112 is engaged with the second rotatable member 114.

The centrifugal pressure force of rotating fluid within the piston cavity or compensator cavity is determined from the following formula:

$$\text{Fcentrifugal} = 2.229 \times 10^{-5} w \, N^2 [R_o^4 - 2R_s^2(R_o^2 - R_i^2) - R_i^4] \quad (1)$$

where:

Fcentrifugal=Centrifugal pressure force on piston or compensator (lb);

$R_o$=Outer radius of piston or compensator (in);

$R_i$=Inner radius of piston or compensator (in);

$R_s$=Radius of oil supply for piston and compensator (in);

w=Specific weight of oil (lb/in$^3$); and

N=Component speed (rpm).

Figure 1:
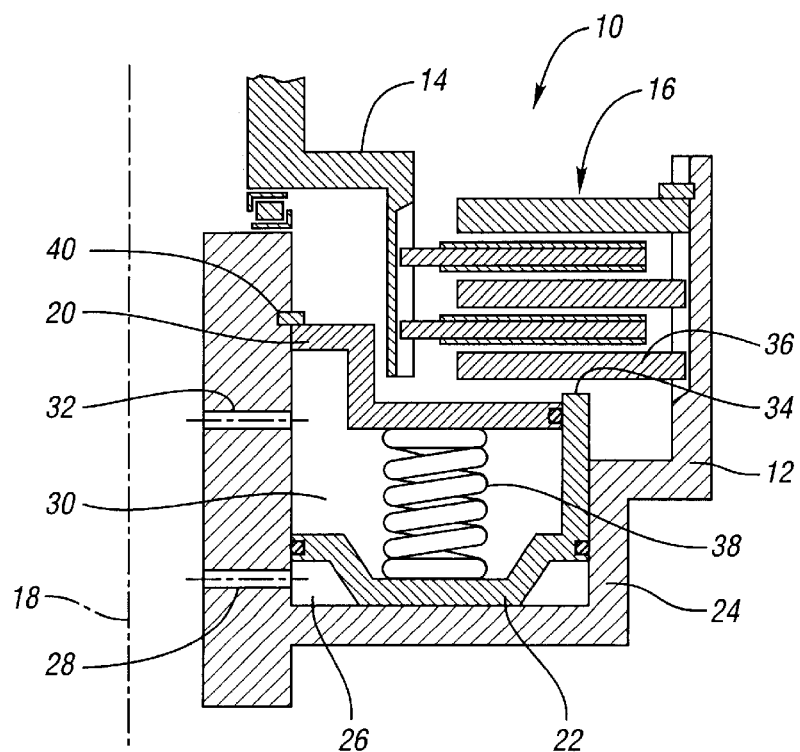
FIG. 1 shows a schematic partial longitudinal cross-sectional view of a prior art rotating clutch system.

Accordingly, in order to eliminate the return spring shown in FIG. 1, the rotating clutch system is redesigned so that the centrifugal pressure force of fluid in the compensator cavity is greater than the centrifugal pressure force of fluid in the piston cavity. This is achieved by enlarging the compensator cavity 130, as shown in FIG. 2, so that the outer radius of the compensator cavity ($R_{oc}$) is greater than the outer radius of the piston cavity ($R_{op}$) with everything else in the above equation unchanged, by providing a larger $R_{oc}$ than $R_{op}$, the centrifugal pressure force of the fluid in the compensator cavity 130 is sufficient to overcome the centrifugal pressure force of fluid in the piston cavity 126. Accordingly, the return spring shown in FIG. 1 becomes unnecessary.

Regarding the above formula, FIG. 2 also illustrates the inner radius ($R_i$) of both the piston and compensator cavities 126, 130, and the radius of oil supply ($R_s$) for the piston cavity 126 and compensator cavity 130.

Accordingly, the piston cavity and compensator cavity are configured such that fluid in the compensator cavity 130 provides a greater centrifugal pressure force against the piston 122 in a clutch release direction than fluid in the piston cavity 126 provides against the piston 122 in a clutch apply direction during rotation. Again, this configuration is achieved by providing the compensator cavity 130 with an outer radius ($R_{oc}$) which is greater than the outer radius ($R_{op}$) of the piston cavity 126.

It may be possible to achieve this greater centrifugal pressure force in the clutch release direction than in the clutch apply direction by adjusting the variables $R_i$ or $R_s$ independently for the piston and the compensator. However, the preferred configuration is as described above.

As further shown in FIG. 2, the piston 122 is configured to form first and second cup-shaped portions 154, 156. The first and second cup-shaped portions 154, 156 define first and second steps 158, 160 in a radially outward direction. The housing 124 is configured to form third and fourth cup-shaped portions 162, 164 aligned with the first and second cup-shaped portions 154, 156 of the piston 122, such that a rim 166 of the housing 124 between the third and fourth cup-shaped portions 162, 164 extends between the first and second steps 158, 160, thereby improving packaging efficiency by reducing the size of the housing 124 in the area of the third and fourth cup-shaped portions 162, 164.

Therefore, not only does the invention reduce cost and mass by eliminating the return spring(s), it also improves packaging efficiency by reducing the size of the housing. In comparing the housing 24 of FIG. 1 with the housing 124 of FIG. 2, the area identified "A" in FIG. 2 is added packaging space. Also, with the return springs eliminated, the oil supply radius of the piston and compensator may be optimally balanced.

Assembly is also improved because the return spring(s) require an assembly tool in order to compress the spring for assembly.

Also, with the return spring eliminated, performance is improved because the spring rate variance due to return spring manufacturing variations is reduced, so there is no corresponding variation in required stroke pressure related to stack-up tolerance of the clutch pack assembly, as described previously with respect to the background art.

It should be noted that the compensator cavity oil should be pressurized sufficiently for failure mode protection by setting the pressure at a level sufficient to overcome seal and clutch plate drag at zero rotational speed to keep the piston released. This pressure level would be design specific.

While the best mode for carrying out the invention has been described in detail, those familiar with the art to which this invention relates will recognize various alternative designs and embodiments for practicing the invention within the scope of the appended claims.

What is claimed is:

1. A clutch assembly for a transmission, the clutch assembly configured to selectively interconnect a first rotatable member with a second rotatable member by engagement of a clutch pack, the clutch assembly comprising:
   a compensator;
   a piston which is axially movable with respect to the compensator and configured to selectively abut and engage the clutch pack to interconnect the first and second rotatable members;
   a clutch housing enclosing the piston, compensator and clutch pack;
   a piston cavity formed between the housing and piston to receive fluid from a clutch apply feed orifice to actuate the piston, said piston cavity having an outer radius ($R_{op}$); and
   a compensator cavity formed between the compensator and piston to receive fluid from a compensator feed orifice, said compensator cavity having an outer radius ($R_{oc}$) greater than said outer radius ($R_{op}$) of the piston cavity, so that fluid in the compensator cavity provides a greater centrifugal pressure force against the piston in a clutch release direction than fluid in the piston cavity provides against the piston in a clutch apply direction during rotation, thereby eliminating the need for a return spring in the compensator cavity.

2. The clutch assembly of claim 1, wherein said housing is integral with the first rotatable member.

3. The clutch assembly of claim 1, further comprising a snap ring positioned to prevent axial movement of the compensator.

4. The clutch assembly of claim 1, wherein said piston is configured to form first and second cup-shaped portions, said first and second cup-shaped portions cooperating to form first and second steps in a radially outward direction.

5. The clutch assembly of claim 4, wherein said housing is configured to form third and fourth cup-shaped portions aligned with said first and second cup-shaped portions of the piston, such that a rim of the housing between the third and fourth cup-shaped portions extends between said first and second steps, thereby improving packaging efficiency.

6. The clutch assembly of claim 1, wherein said compensator comprises a plate.

7. A clutch assembly for a transmission, the clutch assembly configured to selectively interconnect a first rotatable member with a second rotatable member by engagement of a clutch pack, the clutch assembly comprising:
   a compensator;
   a piston which is axially movable with respect to the compensator and configured to selectively abut and engage the clutch pack to interconnect the first and second rotatable members;
   a clutch housing enclosing the piston, compensator and clutch pack;
   a piston cavity formed between the housing and piston to receive fluid from a clutch apply feed orifice to actuate the piston;
   a compensator cavity formed between the compensator and piston to receive fluid from a compensator feed orifice; and
   wherein said piston cavity and compensator cavity are configured such that fluid in the compensator cavity provides a greater centrifugal pressure force against the piston in a clutch release direction than fluid in the piston cavity provides against the piston in a clutch apply direction during rotation, thereby eliminating the need for a return spring in the compensator cavity.

8. The clutch assembly of claim 7, wherein said compensator cavity has an outer radius ($R_{oc}$) greater than an outer radius ($R_{op}$) of the piston cavity, thereby providing said greater centrifugal pressure force against the piston in the clutch release direction than in the clutch apply direction.

9. The clutch assembly of claim 7, wherein said housing is integral with the first rotatable member.

10. The clutch assembly of claim 7, further comprising a snap ring positioned to prevent axial movement of the compensator.

11. The clutch assembly of claim 7, wherein said piston is configured to form first and second cup-shaped portions, said first and second cup-shaped portions cooperating to form first and second steps in a radially outward direction.

12. The clutch assembly of claim 11, wherein said housing is configured to form third and fourth cup-shaped portions aligned with said first and second cup-shaped portions of the piston, such that a rim of the housing between the third and fourth cup-shaped portions extends between said first and second steps, thereby improving packaging efficiency.

13. The clutch assembly of claim 7, wherein said compensator comprises a plate.

* * * * *